United States Patent
Yu

(10) Patent No.: US 7,821,653 B2
(45) Date of Patent: *Oct. 26, 2010

(54) PORTABLE ELECTRONIC MEASURING DEVICE AND METHOD

(75) Inventor: Jing-Bo Yu, Shenzhen (CN)

(73) Assignees: Hong Fu Jin Precision Industry (ShenZhen) Co., Ltd., Shenzhen, Guangdong Province (CN); Hon Hai Precision Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/399,926

(22) Filed: Mar. 7, 2009

(65) Prior Publication Data

US 2009/0225332 A1 Sep. 10, 2009

(30) Foreign Application Priority Data

Mar. 7, 2008 (CN) .................... 2008 1 0300490

(51) Int. Cl.
*G01C 3/08* (2006.01)
*G01B 11/14* (2006.01)

(52) U.S. Cl. .................... 356/625; 356/5.01; 33/277; 33/1 G

(58) Field of Classification Search .................. 356/602, 356/623, 625, 627–636, 3.01, 3.1, 4.01, 5.01, 356/141.1; 250/563, 572

See application file for complete search history.

(56) References Cited

U.S. PATENT DOCUMENTS

| 4,715,709 | A | * | 12/1987 | Sekine et al. | ............ 356/237.2 |
| 4,721,388 | A | * | 1/1988 | Takagi et al. | ................ 356/602 |
| 5,722,179 | A | | 3/1998 | Zanier | |
| 7,355,682 | B2 | * | 4/2008 | Bani-Hashemi | ............. 356/3.1 |
| 2005/0128291 | A1 | * | 6/2005 | Murakami | .................. 348/143 |
| 2009/0228236 | A1 | * | 9/2009 | Yu et al. | ..................... 702/158 |

* cited by examiner

*Primary Examiner*—Sang Nguyen
(74) *Attorney, Agent, or Firm*—Frank R. Niranjan

(57) ABSTRACT

A portable electronic device for measuring a distance D1 between two points E1, E2, includes a visible and rotatable light emitter, an angle computing unit, a distance computing unit and an output unit. The light emitter generates a rotatable light beam capable of rotating from pointing in an initial direction to project to the point E1. The initial direction is substantially perpendicular to a line defined by the points E1, E2. A distance H1 between the light emitter and the line, and a distance S1 from the point E2 to the point of intersection of the line defined by the first and second points E1, E2 with the initial direction, are known. The angle computing unit computes an angle defined by the visible light beam projecting to the point E1 and the initial direction according to the rotatable light beam. The distance computing unit computes the distance D1 based on the angle, the distance H1 and the distance S1.

18 Claims, 3 Drawing Sheets

90

PORTABLE ELECTRONIC MEASURING DEVICE AND METHOD

BACKGROUND

1. Technical Field

Embodiments of the present disclosure relate to distance measuring, and particularly to portable electronic measuring devices and methods.

2. Description of Related Art

Commonly, electronic distance measuring instruments such as laser length measuring instruments are bulky and hard to carry.

Therefore, portable electronic measuring devices and methods are needed to address the aforementioned deficiencies and inadequacies.

DETAILED DESCRIPTION OF EXEMPLARY EMBODIMENTS

Figure 1:
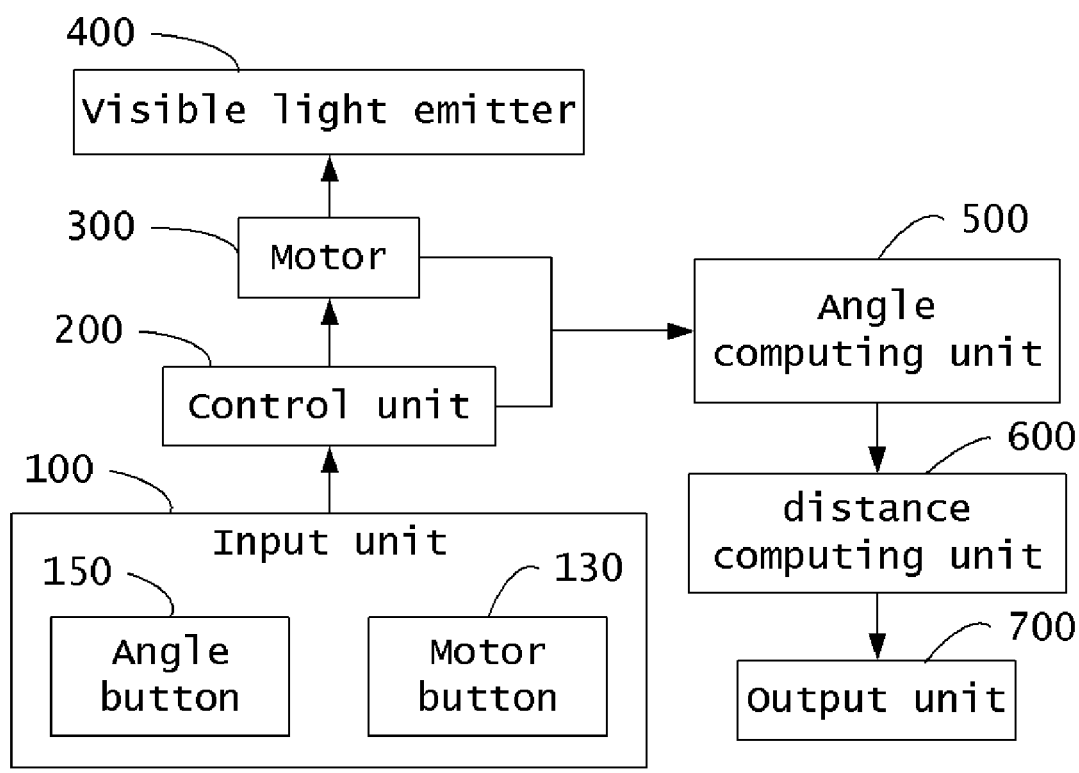
FIG. 1 is a block diagram of a portable electronic device in accordance with an exemplary embodiment.
Figure 2:
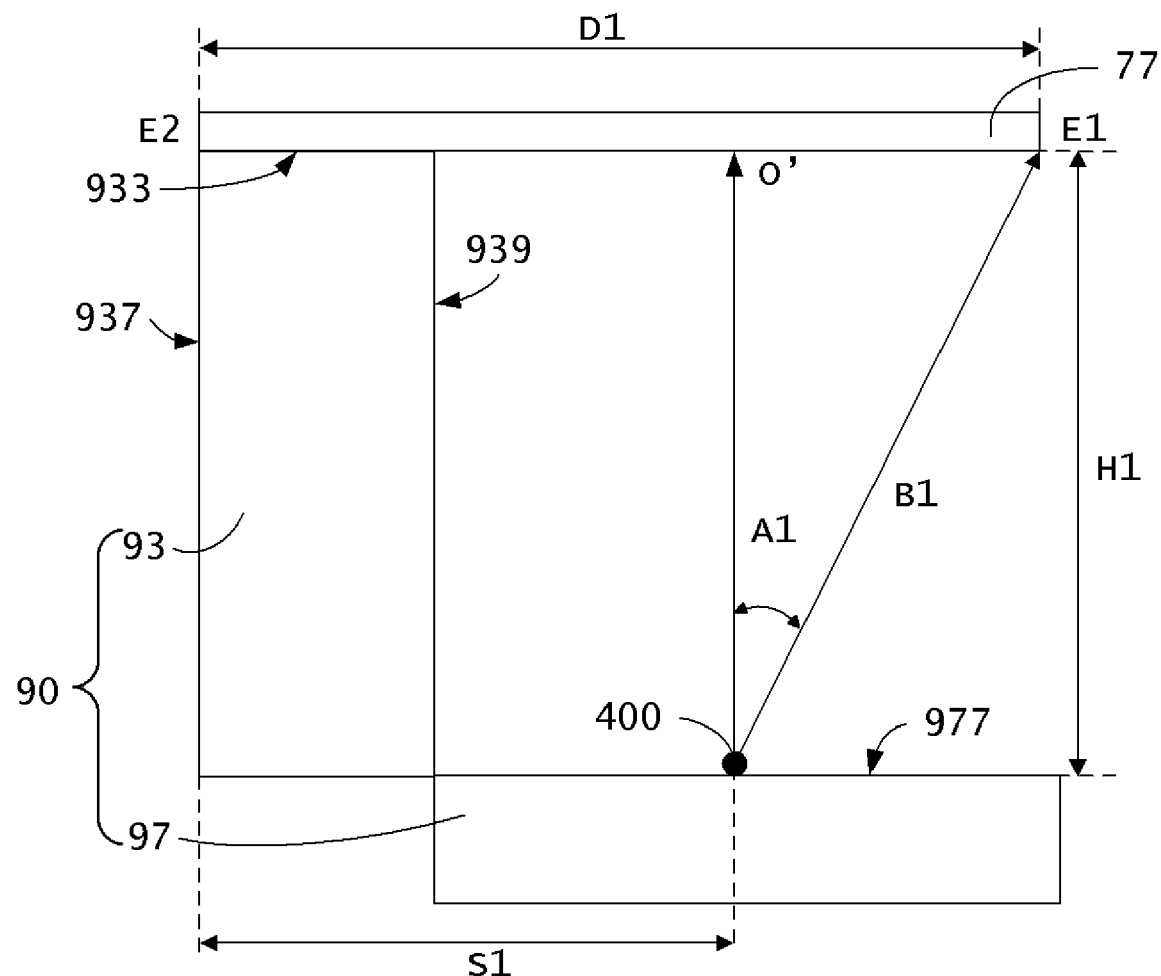
FIG. 2 is a pictorial representation of measuring principle of the portable electronic device in FIG. 1.

Referring to FIG. 1 and FIG. 2, a portable electronic device 90 is used for measuring a distance D1 between a first point E1 and a second point E2 on an object 77. The portable electronic device 90 includes a first member 93, a second member 97 pivotally attached to one end of the first member 93, an input unit 100, a control unit 200, a motor 300, a visible light emitter 400, an angle computing unit 500, a distance computing unit 600, and an output unit 700.

The first member 93 includes an upper surface 933 and a left surface 937 and a right surface 939 correspondingly extended from opposite ends of the upper surface 933. The left surface 937 and the right surface 939 are substantially perpendicular to the upper surface 933. The second member 97 has a first surface 977. The first surface 977 is attached to the right surface 939 when the second member 97 covers the first member 93. The visible light emitter 400 is disposed on the first surface 977.

The input unit 100 is used for receiving an input request, generating an input signal responding to the request, and transmitting the input signal to the control unit 200. The input unit 100 includes a motor button 130 and an angle button 150. A motor signal is generated when the motor button 130 is pressed. An angle signal is generated when the angle button 150 is pressed.

The control unit 200 is used for generating control signals according to the input signal and transmitting the control signals to the respective motor 300 and the angle computing unit 500.

The motor 300 is used for driving the visible light emitter 400 to rotate. Therefore, a visible light beam generated by the visible light emitter 400 can be rotated from an initial direction O' to project to a predetermined direction, such as to the first point E1. The initial direction O' is substantially perpendicular to the first surface 977 and a line joining the first and second points E1, E2.

The angle computing unit 500 is used for computing an angle formed by the initial direction O' and a current direction based on a rotated angle of the motor 300. Therefore, an angle A1 defined by the visible light beam projecting to the first point E1 and the initial direction O' is obtained.

The distance computing unit 600 is connected with the angle computing unit 500. The distance computing unit 600 is used for computing the distance D1 between the first and second points E1, E2 based on the angle A1 computed by the angle computing unit 500.

The output unit 700 can be a visual output or an audio output or both. Thus the Distance D1 may be displayed or a speaker could announce the distance D1 or the Distance D1 could be displayed and announced.

In operation, the second member 97 is rotated and stopped substantially perpendicular to the first member 93. The upper surface 933 is attached to the line defined by the first and second points E1, E2. The point E2 coincides with the plane of the left surface 937. The first surface 977 is substantially parallel to the upper surface 933 and the line defined by the first and second points E1, E2. A distance S1 from the point E2 to the point of intersection of the line defined by the first and second points E1, E2 with the initial direction O' is known. A perpendicular distance H1 between the visible light emitter 400 and the line defined by the first and second points E1, E2 is known.

Then the motor signal is received by the control unit 200. The control unit 200 generates a first control signal according to the motor signal and transmits the first control signal to the motor 300. The motor 300 rotates the visible light emitter 400 according to the first control signal. When the visible light beam generated by the visible light emitter 400 projects to the first point E1, the angle button 150 is pressed. The control unit 200 receives the angle signal, generates a second control signal according to the angle signal and transmits the second control signal to the angle computing unit 500. The angle computing unit 500 computes a first angle A1 defined by the initial direction O' and the visible light beam projecting to the first point E1 according to a rotated angle of the motor 300.

Finally, the distance D1 between the first and second points E1, E2 is computed based on the first angle A1, the distance H1, and the distance S1. In this embodiment, the distance D1 is computed according to the following formula: $D1=S1+H1*\tan \angle A1$. Therefore, the distance D1 between the first and second points E1, E2 computed by the portable electronic device 90 can be known and furthermore, the portable electronic device 90 is convenient to carry. In other embodiments, if the point E1 is to the left of the light emitter 400 but not beyond the right surface 939, the distance D1 is computed according to the following formula: $D1=S1-H1*\tan \angle A1$.

Figure 3:
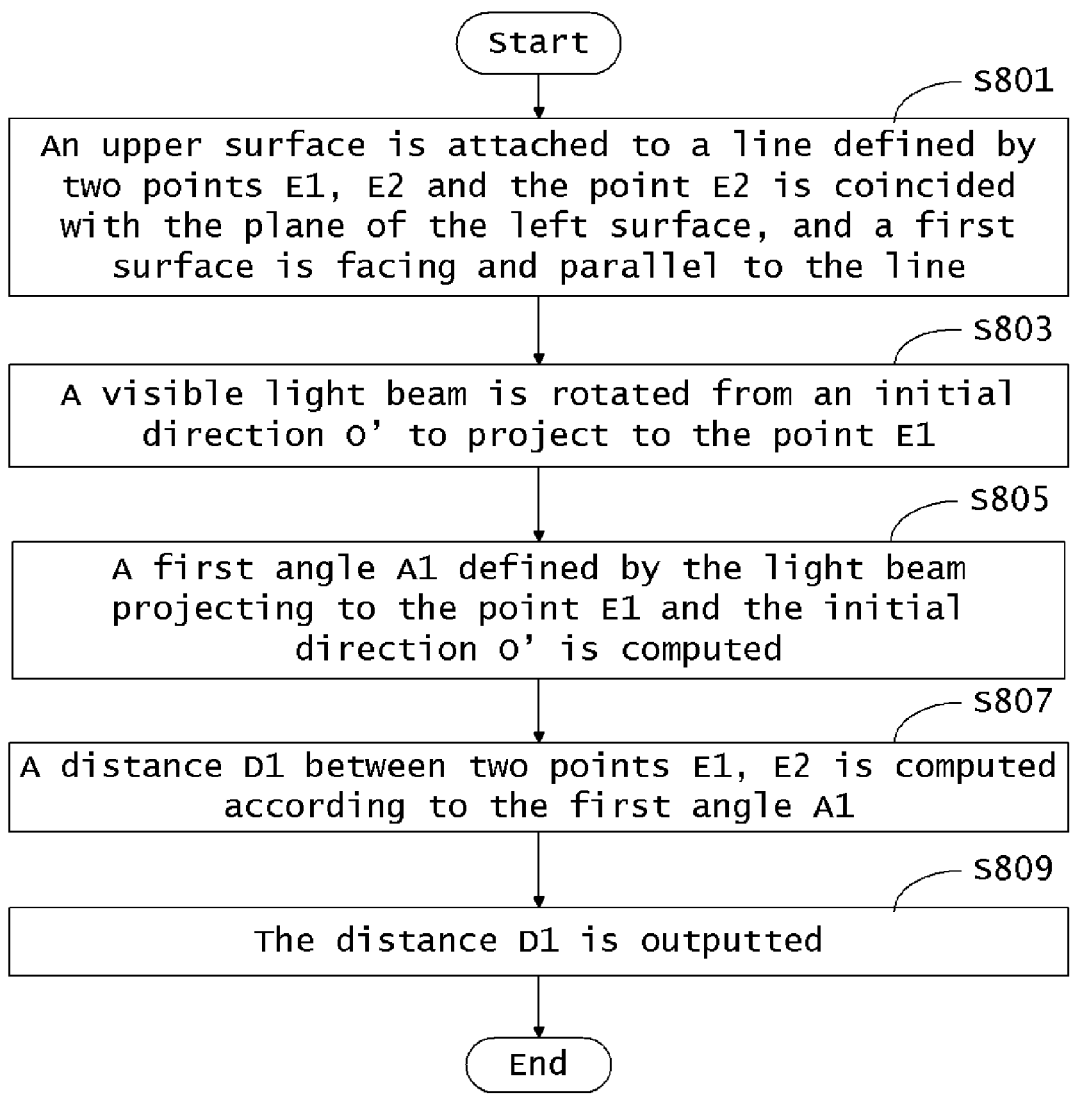
FIG. 3 is a flowchart of a method for measuring a distance between two points in accordance with an exemplary embodiment.

Referring to FIG. 2 and the flowchart of FIG. 3, a method for measuring a distance D1 between two points E1, E2 in accordance with an exemplary embodiment is shown. The method may be implemented using a portable electronic device, such as the portable electronic device 90 (FIG. 1). The portable electronic device may include a first member and a second member pivotally attached to one end of the first member. The first member includes an upper surface, a left surface and a right surface correspondingly extended from two opposite ends of the upper surface. The left surface and the right surface are substantially perpendicular to the upper surface. The second member has a first surface. The first surface is attached to the right surface when the second member covers the first member.

The various actions in the method may be performed in the order presented, or may be performed in a different order. Furthermore, in some embodiments, some actions shown in FIG. 3 may be omitted from the method. The method shown includes the following steps.

Beginning in step S801, the second member is rotated and stopped substantially perpendicular to the first member, the upper surface is attached to a line joining the two points E1, E2, and the point E2 coincides with the extension of the plane of the left surface, thus the first surface is substantially parallel to the upper surface and the line defined by the two point E1, E2.

In step S803, a visible light beam B1, may be generated by a visible light emitter disposed on a first surface, is rotated from an initial direction O' to project to the point E1. The initial direction O' is substantially perpendicular to the first surface and the line defined by the two points E1, E2. The visible light emitter may be driven by a motor to rotate the visible light beam B1. A distance S1 from the point E2 to the point of intersection of the line defined by the first and second points E1, E2 with the initial direction O' is known. A perpendicular distance H1 between the visible light emitter and the line is known.

In step S805, a first angle A1 defined by the visible light beam B1 projecting to the point E1 and the initial direction O' is computed. The first angle A1 may be computed according to a rotated angle of the motor.

In step S807, the distance D1 between the two points E1, E2 is computed based on the distance H1, the distance S1 and the first angle A1. In this embodiment, the distance D1 between two points is computed according to the following formula: D1=S1+H1*tan ∠A1. In other embodiment, if the point E1 is to the left of the light emitter 400 but not beyond the right surface 939, the distance D1 is computed according to the following formula: D1=S1−H1*tan ∠A1.

In step S809, the distance D1 is outputted via visual images or audible sounds.

It is to be understood, however, that even though numerous information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A portable electronic device for measuring a distance (D1) between two points (E1, E2), the portable electronic device comprising:
   a visible and rotatable light emitter for generating a rotatable light beam capable of rotating from an initial direction to project to the point (E1), the initial direction being substantially perpendicular to a line joining the points (E1, E2), a perpendicular distance (H1) between the light emitter and the line, and a distance (S1) from the point (E2) to the point of intersection of the line defined by the first and second points (E1, E2) with the initial direction, being known;
   an angle computing unit for computing a first angle defined by the visible light beam projecting to the point (E1) and the initial direction according to the rotatable light beam;
   a distance computing unit for computing the distance (D1) based on the first angle, the distance (H1) and the distance (S1); and
   an output unit for outputting the distance (D1).

2. The portable electronic device according to claim 1, wherein the visible and rotatable light emitter comprises a visible light emitter and a drive unit for rotate the visible light emitter thus the light beam rotates, and the first angle is computed according to a rotated angle of the drive unit.

3. The portable electronic device according to claim 2, wherein the drive unit is a motor.

4. The portable electronic device according to claim 3, wherein the portable electronic device further comprising:
   an input unit for receiving a request, generating an input signal according to the request, and transmitting the input signal to a control unit, and
   the control unit connected with the input unit, the motor and the angle computing unit, the control unit for generating control signals according to the received input signals and transmitting the control signals to the motor and the angle computing unit correspondingly.

5. The portable electronic device according to claim 4, wherein the input unit comprises a motor button and an angle button, a motor signal is generated when the motor button is pressed, the control unit generates a first control signal according to the received motor signal and transmits the first control signal to the motor; an angle signal is generated when the angle button is pressed, the control unit generates a second control signal according to the angle distance signal and transmits the second control signal to the angle computing unit.

6. The portable electronic device according to claim 1, wherein the portable electronic device comprises a first member having a first surface capable of being parallel to the line, and the visible and rotatable light emitter is disposed on the first surface.

7. The portable electronic device according to claim 6, wherein the portable electronic device comprises a second member substantially perpendicular to the first member, the second member having a second surface, a third surface and a fourth extended from two end of the second surface, the second surface is attached to the line and substantially parallel to the first surface, the third surface and the fourth surface are substantially perpendicular to the first surface, the fourth surface is connected to the first surface, and located between the first surface and the third surface.

8. The portable electronic device according to claim 7, wherein the point (E2) coincides with the plane of the third surface.

9. The portable electronic device according to claim 8, wherein the second member is pivotally connected to the first member, the first surface is attached to the second surface when the second member covers the first member.

10. The portable electronic device according to claim 1, wherein the output unit outputs the distance via visual images or audible sounds.

11. A portable electronic device for measuring a distance between two points, the portable electronic device comprising:
   a visible and rotatable light emitter for generating a rotatable light beam;
   an angle computing unit for computing an angle defined by the rotatable light beams;
   a distance computing unit for computing a distance between the two points according to the angle; and
   an output unit for outputting the distance, wherein the portable electronic device comprises a first member having a first surface capable of being parallel to the line, and the visible and rotatable light emitter is disposed on the first surface, and wherein the portable electronic device comprises a second member substantially perpendicular to the first member, the second member having a second surface, a third surface and a fourth extended from two end of the second surface, the second surface is attached to the line and substantially parallel to the first surface, the third surface and the fourth surface are substantially perpendicular to the first surface, the fourth surface is connected to the first surface, and disposed between the first surface and the third surface.

12. The portable electronic device according to claim 11, wherein the visible and rotatable light emitter comprises a visible light emitter and a drive unit for rotating the visible light emitter to rotate, and the first angle is computed according to a rotated angle of the drive unit.

13. The portable electronic device according to claim 12, wherein the drive unit is a motor.

14. The portable electronic device according to claim 13, wherein the portable electronic device further comprises:
   an input unit for receiving a request, generating an input signal according to the request, and transmitting the input signal to a control unit, and
   the control unit connected with the input unit, the motor and the angle computing unit, the control unit for generating control signals according to the received input signals and transmitting the control signals to the motor and the angle computing unit correspondingly.

15. The portable electronic device according to claim 14, wherein the input unit comprises a motor button and an angle button, a motor signal is generated when the motor button is pressed, the control unit generates a first control signal according to the received motor signal and transmits the first control signal to the motor; an angle signal is generated when the angle button is pressed, the control unit generates a second control signal according to the angle distance signal and transmits the second control signal to the angle computing unit.

16. The portable electronic device according to claim 11, wherein the output unit outputs the distance via visual images or audible sounds.

17. A method for measuring a distance (D1) between two points (E1) and (E2), the method comprising:
   a rotatable light beam generated by a visible and rotatable light emitter is rotated from an initial direction (O') to project to the point (E1); the initial direction (O') being substantially perpendicular to a line joining the two point (E1, E2); a distance (H1) between the light emitter and the line, and a distance (S1) from the point (E2) to the point of intersection of the line defined by the first and second points (E1, E2) with the initial direction (O)', being known;
   a first angle (A1) defined by the visible light beam (B1) projecting to the point (E1) and the initial direction (O') is computed;
   the distance (D1) is computed based on the distance (H1), the distance (S1) and the first angle (A1); and
   the distance (D1) is outputted.

18. The method according to claim 17, wherein the distance (D1) is outputted via visual images or audible sounds.

* * * * *